(12) United States Patent
Isshiki et al.

(10) Patent No.: US 11,472,470 B2
(45) Date of Patent: Oct. 18, 2022

(54) CONTROL DEVICE FOR APPLYING TORQUE TO A STEERING MEMBER

(71) Applicant: Showa Corporation, Gyoda (JP)

(72) Inventors: Ken Isshiki, Haga-gun (JP); Eishi Ishimaru, Haga-gun (JP); Kyouichi Tagami, Haga-gun (JP); Nobuyuki Enomoto, Haga-gun (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 248 days.

(21) Appl. No.: 16/844,587

(22) Filed: Apr. 9, 2020

(65) Prior Publication Data

US 2020/0231204 A1    Jul. 23, 2020

Related U.S. Application Data

(63) Continuation of application No. PCT/JP2018/000905, filed on Jan. 16, 2018.

(30) Foreign Application Priority Data

Dec. 25, 2017  (JP) .............................. JP2017-248268

(51) Int. Cl.
*B62D 5/04*    (2006.01)
*B62D 6/00*    (2006.01)

(52) U.S. Cl.
CPC ........... *B62D 5/0463* (2013.01); *B62D 6/008* (2013.01); *B62D 5/0412* (2013.01)

(58) Field of Classification Search
CPC ...................................................... B62D 6/008
See application file for complete search history.

(56) References Cited

U.S. PATENT DOCUMENTS

2008/0142293 A1 * 6/2008 Goto ..................... B62D 6/003
                                                             701/42
2009/0192679 A1    7/2009 Kobayahsi et al.
(Continued)

FOREIGN PATENT DOCUMENTS

DE         10260752 A1    7/2004
DE    102010024171 A1   12/2011
(Continued)

OTHER PUBLICATIONS

International Search Report dated Apr. 10, 2018 for the corresponding International Patent Application No. PCT/JP2018/000905.
(Continued)

*Primary Examiner* — Christian Chace
*Assistant Examiner* — Amelia Vorce
(74) *Attorney, Agent, or Firm* — Leason Ellis LLP

(57) ABSTRACT

Assist torque or reaction force torque with little unnatural feeling to a driver is applied. An ECU includes: a control amount calculation section that calculates a control amount for controlling magnitude of the assist torque or the reaction force torque with reference to steering torque applied to a steering member; and a control amount correction section that corrects the control amount calculated by the control amount calculation section with reference to a lateral G of a vehicle body, a steering angle of the steering member, and a steering angle speed of the steering member.

2 Claims, 3 Drawing Sheets

(56) References Cited

U.S. PATENT DOCUMENTS

| | | | | |
|---|---|---|---|---|
| 2010/0087988 A1* | 4/2010 | Nakamura | ............... | B62D 6/04 |
| | | | | 701/41 |
| 2010/0280715 A1 | 11/2010 | Kobayahsi et al. | | |
| 2010/0286871 A1 | 11/2010 | Kobayahsi et al. | | |
| 2015/0057890 A1* | 2/2015 | Tamaizumi | ............ | B62D 6/008 |
| | | | | 701/41 |
| 2017/0088174 A1* | 3/2017 | Inoue | .................... | B62D 5/0457 |
| 2017/0175659 A1* | 6/2017 | Sunahara | ................ | F02D 41/12 |
| 2018/0065658 A1* | 3/2018 | Aoki | ...................... | B62D 6/008 |

FOREIGN PATENT DOCUMENTS

| | | |
|---|---|---|
| DE | 102010048261 A1 | 4/2012 |
| JP | 2004-291815 A | 10/2004 |
| JP | 2005-088754 A | 4/2005 |
| JP | 2005-255081 A | 9/2005 |
| JP | 2006-123827 A | 5/2006 |
| JP | 2006-205996 A | 8/2006 |
| JP | 2007-038766 A | 2/2007 |
| JP | 2013-212715 A | 10/2013 |
| JP | 6279121 B1 | 2/2018 |

OTHER PUBLICATIONS

German Office Action dated Mar. 21, 2022 for the corresponding German Patent Application No. 112018006594.4, 10 pages including English translation.

\* cited by examiner

CONTROL DEVICE FOR APPLYING TORQUE TO A STEERING MEMBER

CROSS-REFERENCE TO RELATED APPLICATION(S)

This application is a continuation of PCT application No. PCT/JP2018/000905 filed on Jan. 16, 2018, which claims the benefit of priority to Japanese Patent Application No. 2017-248268 filed on Dec. 25, 2017, the contents of which are incorporated herein by reference.

BACKGROUND

1. Technical Field

The present invention relates to a control device that apply assist torque or reaction force torque to a steering member.

2. Background Art

A steering device that applies assist torque or reaction force torque to a steering member is available. In the steering device, there are available a technique for correcting an assist target current based on a difference between a target steering speed and an actual steering speed (Patent Document 1) and a technique for determining a steering state of a steering wheel based on a direction of steering torque and a rotation direction of an assist motor (Patent Document 2).

Patent Document 1: JP-A-2006-123827 (published on May 18, 2006)

Patent Document 2: JP-A-2013-212715 (published on Oct. 17, 2013)

In a control device that applies assist torque or reaction force torque to a steering member, it is desirable to apply the assist torque or the reaction force torque with little unnatural feeling to a driver of a vehicle to the steering member.

An object of the present invention is to provide a control device that applies assist torque or reaction force torque to a steering member with little unnatural feeling to a driver.

SUMMARY OF THE INVENTION

Accordingly, an aspect of the present invention provides a control device configured to apply assist torque or reaction force torque to a steering member steered by a driver. The control device includes: a control amount calculation section configured to calculate a control amount for controlling magnitude of the assist torque or the reaction force torque with reference to steering torque applied to the steering member; and a control amount correction section configured to correct the control amount calculated by the control amount calculation section with reference to acceleration in a lateral direction of a vehicle body, a steering angle of the steering member, and a steering angle speed of the steering member, wherein the control amount correction section is configured to correct the control amount calculated by the control amount calculation section such that a reaction force applied to the steering member becomes larger when the steering member is in a switch-back state, the steering angle speed of the steering member or an absolute value thereof is equal to or greater than a predetermined value, and the acceleration in the lateral direction of the vehicle body or an absolute value thereof is less than a predetermined value.

Another aspect of the present invention provides a control device configured to apply assist torque or reaction force torque to a steering member steered by a driver. The control device includes: a control amount calculation section configured to calculate a control amount for controlling magnitude of the assist torque or the reaction force torque with reference to steering torque applied to the steering member; and a control amount correction section configured to correct the control amount calculated by the control amount calculation section with reference to a yaw rate of a vehicle body, a steering angle of the steering member, and a steering angle speed of the steering member, wherein the control amount correction section is configured to correct the control amount calculated by the control amount calculation section such that a reaction force applied to the steering member becomes larger when the steering member is in a switch-back state, the steering angle speed of the steering member or an absolute value thereof is equal to or greater than a predetermined value, and acceleration in a lateral direction of the vehicle body calculated by using the yaw rate or an absolute value thereof is less a predetermined value.

A further aspect of the present invention provides a steering device including: a steering member steered by a driver; and a steering control section configured to apply assist torque or reaction force torque to the steering member, wherein the steering control section includes: a control amount calculation section configured to calculate a control amount for controlling magnitude of the assist torque or the reaction force torque with reference to steering torque applied to the steering member; and a control amount correction section configured to correct the control amount calculated by the control amount calculation section with reference to acceleration in a lateral direction of a vehicle body, a steering angle of the steering member, and a steering angle speed of the steering member, wherein the control amount correction section is configured to correct the control amount calculated by the control amount calculation section such that a reaction force applied to the steering member becomes larger when the steering member is in a switch-back state, the steering angle speed of the steering member or an absolute value thereof is equal to or greater than a predetermined value, and the acceleration in the lateral direction of the vehicle body or an absolute value thereof is less than a predetermined value.

A still further aspect of the present invention provides a steering device including: a steering member steered by a driver; and a steering control section configured to apply assist torque or reaction force torque to the steering member, wherein the steering control section includes: a control amount calculation section configured to calculate a control amount for controlling magnitude of the assist torque or the reaction force torque with reference to steering torque applied to the steering member; and a control amount correction section configured to correct the control amount calculated by the control amount calculation section with reference to a yaw rate of a vehicle body, a steering angle of the steering member, and a steering angle speed of the steering member, wherein the control amount correction section is configured to correct the control amount calculated by the control amount calculation section such that a reaction force applied to the steering member becomes larger when the steering member is in a switch-back state, the steering angle speed of the steering member or an absolute value thereof is equal to or greater than a predetermined value, and acceleration in a lateral direction of the vehicle body calculated by using the yaw rate or an absolute value thereof is less than a predetermined value.

According to the present invention, assist torque or reaction force torque can be applied with little unnatural feeling to a driver.

DESCRIPTION OF EMBODIMENTS

First Embodiment

Hereinafter, a first embodiment of the present invention will be described in detail.

[Configuration of Vehicle 900]

Figure 1:
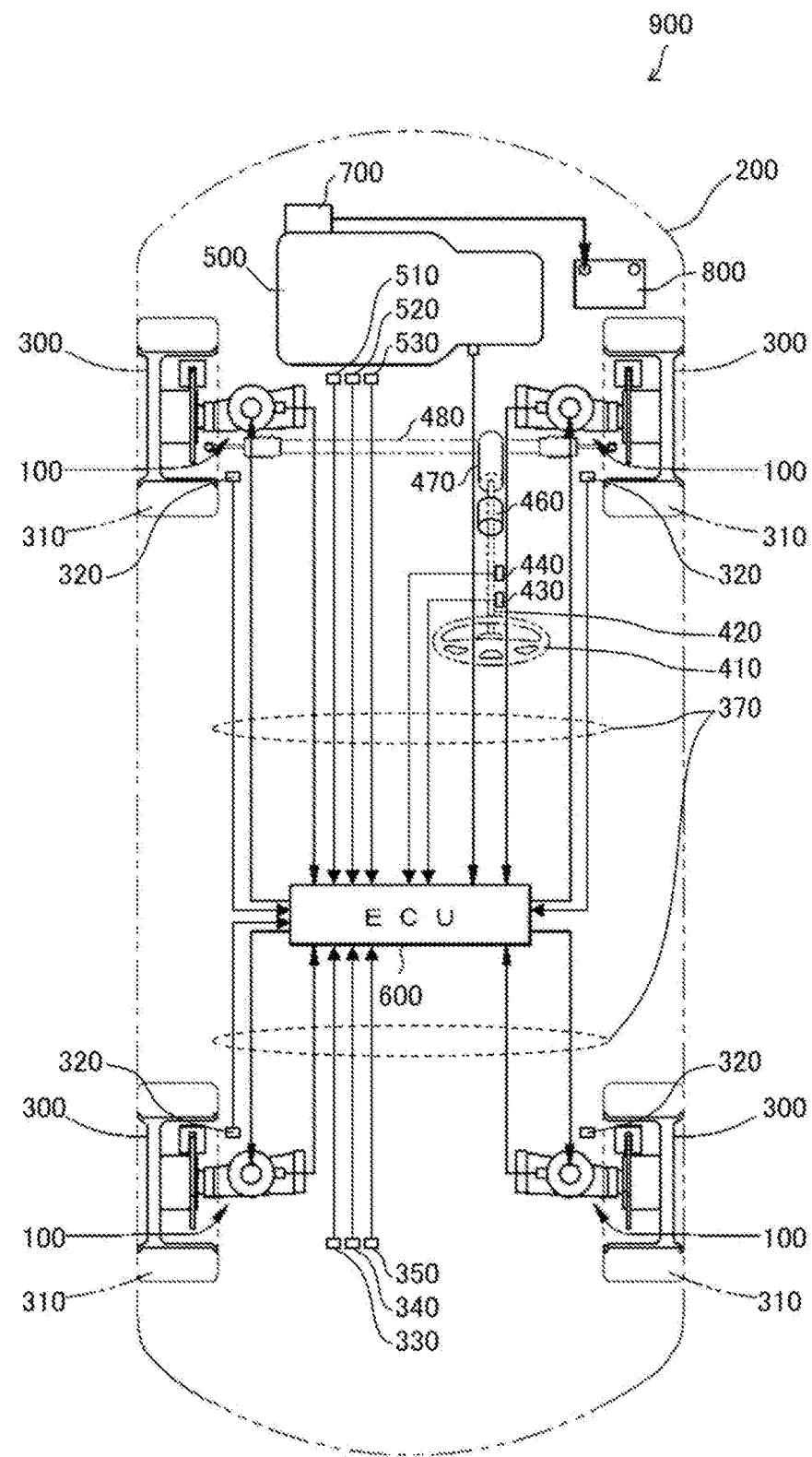
FIG. 1 is a diagram illustrating a schematic configuration of a vehicle according to a first embodiment of the present invention.

FIG. 1 is a diagram illustrating a schematic configuration of a vehicle 900 according to the embodiment. As illustrated in FIG. 1, the vehicle 900 includes suspension devices (suspensions) 100, a vehicle body 200, wheels 300, tires 310, a steering member 410, a steering shaft 420, a torque sensor 430, a steering angle sensor 440, a torque application section 460, a rack and pinion mechanism 470, a rack shaft 480, an engine 500, an electronic control unit (ECU) (control device) 600, a power generation device 700, and a battery 800.

The wheel 300 on which the tire 310 is mounted is suspended from the vehicle body 200 by the suspension device 100. Since the vehicle 900 is a four-wheeled vehicle, four suspension devices 100, wheels 300, and tires 310 are respectively provided.

The power generation device 700 is provided to the engine 500, and electric power generated by the power generation device 700 is stored in the battery 800.

The steering member 410 operated by a driver is connected to one end of the steering shaft 420 such that torque can be transmitted, and the other end of the steering shaft 420 is connected to the rack and pinion mechanism 470.

The rack and pinion mechanism 470 is a mechanism for converting rotation around an axis of the steering shaft 420 into movement along an axial direction of the rack shaft 480. When the rack shaft 480 is moved in the axial direction, the wheel 300 is steered via a tie rod and a knuckle arm.

The torque sensor 430 detects steering torque applied to the steering shaft 420, in other words, steering torque applied to the steering member 410, and provides the ECU 600 with a torque sensor signal indicating a detection result. Specifically, the torque sensor 430 detects torsion of a torsion bar provided inside the steering shaft 420, and outputs the detection result as the torque sensor signal. As the torque sensor 430, a related-art sensor such as a Hall IC, an MR element, and a magnetostriction type torque sensor may be used.

The steering angle sensor 440 detects a steering angle of the steering member 410 and provides a detection result to the ECU 600.

The torque application section 460 applies assist torque or reaction force torque corresponding to a steering control amount supplied from the ECU 600 to the steering shaft 420. The torque application section 460 includes a motor that generates the assist torque or the reaction force torque corresponding to the steering control amount, and a torque transmission mechanism that transmits the torque generated by the motor to the steering shaft 420.

Specific examples of the "control amount" in the present specification include a current value, a duty ratio, an attenuation rate, and an attenuation ratio.

The steering member 410, the steering shaft 420, the torque sensor 430, the steering angle sensor 440, the torque application section 460, the rack and pinion mechanism 470, the rack shaft 480, and the ECU 600 constitute a steering device according to the embodiment.

In the above description, "connected such that torque can be transmitted" refers to that the connection is made such that rotation of one member causes rotation of the other member, and at least includes, for example, a case where one member and the other member are integrally formed; a case where the other member is directly or indirectly fixed to one member; and a case where one member and the other member are connected so as to interlock with each other via a joint member.

In the above example, the steering device in which the steering member 410 to the rack shaft 480 are always mechanically connected is described as an example, but this does not limit the embodiment, and the steering device according to the embodiment may be, for example, a steer-by-wire type steering device. Contents described hereinbelow in the present specification can also be applied to the steer-by-wire type steering device.

The ECU 600 performs overall control of various electronic devices provided in the vehicle 900. Specifically, the ECU 600 controls the magnitude of the assist torque or the reaction force torque applied to steering shaft 420 by adjusting the steering control amount supplied to the torque application section 460.

The vehicle 900 includes: a wheel speed sensor 320 that is provided for each wheel 300 and detects a wheel speed of each wheel 300; a lateral G sensor 330 that detects acceleration in a lateral direction of the vehicle 900 (hereinafter also referred to as "lateral G"); a front and rear G sensor 340 that detects acceleration in a front and rear direction of the vehicle 900; a yaw rate sensor 350 that detects a yaw rate of the vehicle 900; an engine torque sensor 510 that detects torque generated by the engine 500; an engine speed sensor 520 that detects the number of rotations of the engine 500; and a brake pressure sensor 530 that detects a pressure applied to a brake fluid provided in a brake device. Detection results by these various sensors are supplied to the ECU 600.

Although illustration is omitted, the vehicle 900 includes: an antilock brake system (ABS) which is a system to prevent wheel lock during braking; a traction control system (TCS) that reduces idling of a wheel during acceleration; and a brake device capable of controlling electronic stability control (ESC) which is a vehicle behavior stabilization control system provided with an automatic brake function for yaw moment control and a brake assist function during turning.

Here, the ABS, the TCS, and the ESC compare a wheel speed determined according to an estimated vehicle speed with a wheel speed detected by the wheel speed sensor 320, and determine a slip state when the values of the two wheel speeds are different from each other by a predetermined value or more. Through such processing, the ABS, the TCS, and the ESC perform appropriate brake control and traction control according to a traveling state of the vehicle 900, so that the behavior of the vehicle 900 can be stabilized.

The detection results by the above-described various sensors are supplied to the ECU 600 and control signals are transmitted from the ECU 600 to the respective sections via a controller area network (CAN) 370.

[ECU 600]

Figure 2:
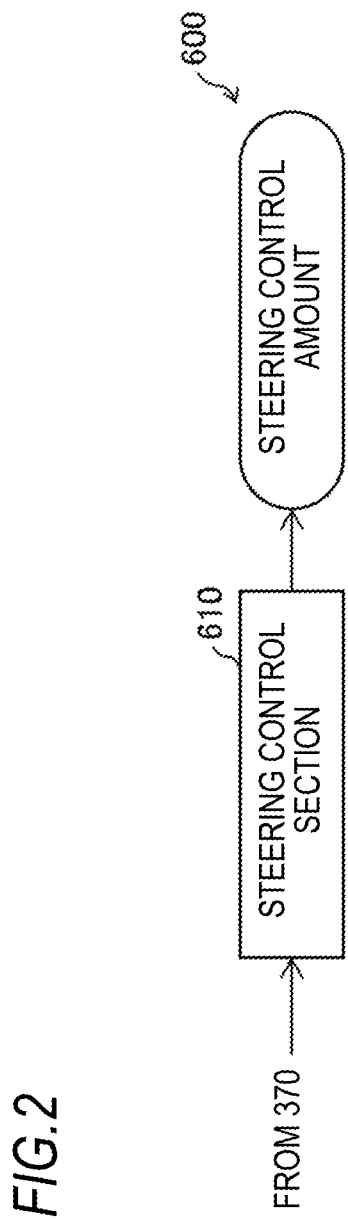
FIG. 2 is a block diagram illustrating a schematic configuration of an ECU according to the first embodiment of the present invention.

Hereinafter, the ECU 600 will be specifically described with reference to next drawings. FIG. 2 is a diagram illustrating a schematic configuration of the ECU 600.

As illustrated in FIG. 2, the ECU 600 includes a steering control section 610 and a suspension control section 650.

The steering control section 610 determines the magnitude of the steering control amount to be supplied to the torque application section 460 with reference to various sensor detection results included in the CAN 370.

In the present specification, the description "with reference to . . . " may include the meaning of "using . . . ", "considering . . . ", and "depending on . . . ".

The processing of "determining the magnitude of the control amount" also includes a case where the magnitude of the control amount is set to zero, that is, the control amount is not supplied.

[Steering Control Section]

Figure 3:
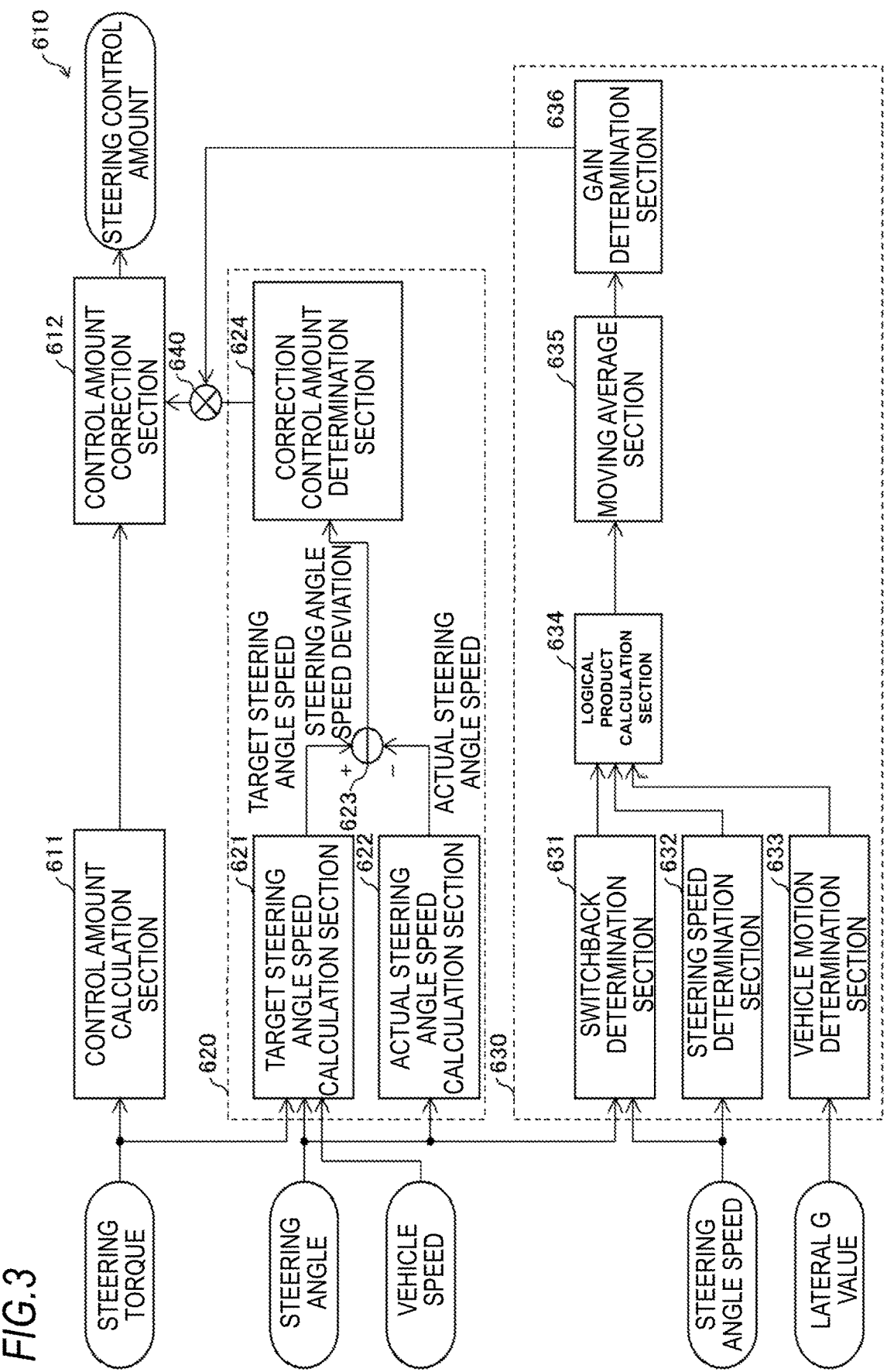
FIG. 3 is a block diagram illustrating a configuration example of a steering control section according to the first embodiment of the present invention.

Next, the steering control section 610 will be described specifically with reference to FIG. 3. FIG. 3 is a block diagram illustrating a configuration example of the steering control section 610.

As illustrated in FIG. 3, the steering control section 610 includes a control amount calculation section 611, a control amount correction section 612, a ω feedback section 620, a gain calculation section 630, and a multiplication section 640.

The control amount calculation section 611 refers to the steering torque supplied from the torque sensor 430 and calculates the control amount for controlling the magnitude of the assist torque or the reaction force torque. The control amount calculated by the control amount calculation section 611 is corrected by the control amount correction section 612, and then supplied to the torque application section 460 as the steering control amount.

[ω Feedback Section]

The ω feedback section 620 refers to the steering angle supplied from the steering angle sensor 440, the vehicle speed determined according to the wheel speed detected by the wheel speed sensor 320, and the steering torque supplied from the torque sensor 430, and then determines a value of a correction control amount.

As an example, as illustrated in FIG. 3, the ω feedback section 620 includes a target steering angle speed calculation section 621, an actual steering angle speed calculation section 622, a subtraction section 623, and a correction control amount determination section 624.

The target steering angle speed calculation section 621 refers to the steering angle supplied from the steering angle sensor 440, the vehicle speed determined according to the wheel speed detected by the wheel speed sensor 320, and the steering torque supplied from the torque sensor 430, and then calculates a target steering angle speed. Here, a specific calculation method of the target steering angle speed does not limit the embodiment, and in calculating the target steering angle speed, the target steering angle speed calculation section 621 can be configured to refer to a target steering angle speed map and a torque ratio map.

The actual steering angle speed calculation section 622 specifies an actual steering angle speed by calculating a time change of the steering angle supplied from the steering angle sensor 440.

The subtraction section 623 subtracts the actual steering angle speed calculated by the actual steering angle speed calculation section 622 from the target steering angle speed calculated by the target steering angle speed calculation section 621, and a steering angle side deviation, which is a result of the subtraction, is supplied to the correction control amount determination section 624.

The correction control amount determination section 624 determines the value of the correction control amount according to the steering angle side deviation. A specific determination method of the value of the correction control amount does not limit the embodiment, and in determining the value of the correction control amount, the correction control amount determination section 624 can be configured to refer to a steering angle speed deviation correction control amount map.

[Gain Calculation Section]

The gain calculation section 630 calculates a gain coefficient to be multiplied by the correction control amount calculated by the ω feedback section 620 with reference to the steering angle supplied from the steering angle sensor 440 and the lateral G value supplied from the CAN 370.

As an example, as illustrated in FIG. 3, the gain calculation section 630 includes a switch-back determination section 631, a steering speed determination section 632, a vehicle motion determination section 633, a logical product calculation section 634, a moving average section 635, and a gain determination section 636.

The switch-back determination section 631 determines whether the steering member 410 is in a switch-back state with reference to the steering angle supplied from the steering angle sensor 440 and the steering angle speed calculated by referring to the steering angle. When the steering member 410 is in the switch-back state, the switch-back determination section 631 outputs "1" as a determination result, and otherwise outputs "0" as the determination result. It may be configured that the vehicle 900 includes a steering angle speed sensor, and the switch-back determination section 631 determines whether the steering member 410 is in the switch-back state with reference to the steering angle supplied from the steering angle sensor 440 and the steering angle speed supplied from the steering angle speed sensor.

The determination processing of the switch-back state by the switch-back determination section 631 is not limited to the above-described example. The switch-back determination section 631 may be configured to determine whether the steering member 410 is in the switch-back state with reference to the torque sensor signal indicating the detection result by the torque sensor 430 and a rotation direction of the motor provided in the torque application section 460. In this configuration, for example, when a sign of the torque sensor signal and a sign of the rotation direction of the motor are different from each other, it may be configured to determine the switch-back state.

Here, for example, in the sign of the torque sensor signal, the sign of the torque sensor signal when the torsion bar is in a state of being twisted in a clockwise direction may be defined as positive, and the sign of the torque sensor signal when the torsion bar is in a state of being twisted in a counterclockwise direction may be defined as negative. In the sign of the rotation direction of the motor, a direction for eliminating the twist of the torsion bar in the state where the torsion bar is twisted in the clockwise direction may be defined as positive, and a direction for eliminating the twist of the torsion bar in the state where the torsion bar is twisted in the counterclockwise direction may be defined as negative.

The steering speed determination section 632 determines whether the steering angle speed to be calculated with reference to the steering angle supplied from the steering angle sensor 440 or an absolute value thereof is equal to or greater than a predetermined value. The steering speed determination section 632 outputs "1" as a determination result when the steering angle speed or the absolute value thereof is equal to or greater than the predetermined value, and otherwise outputs "0" as the determination result.

The vehicle motion determination section 633 determines whether the lateral G value to be supplied from the CAN 370 or an absolute value thereof is less than a predetermined value. The vehicle motion determination section 633 outputs "1" as a determination result when the lateral G value or the absolute value thereof is less than the predetermined value, and otherwise outputs "0" as the determination result.

The logical product calculation section 634 performs a logical product of the determination results from the switch-back determination section 631, the steering speed determination section 632, and the vehicle motion determination section 633, and outputs a result thereof. In other words, the logical product calculation section 634 outputs "1" when all the determination results outputted by the switch-back determination section 631, the steering speed determination section 632, and the vehicle motion determination section 633 are all "1", and otherwise outputs "0".

The moving average section 635 calculates a moving average of the output of the logical product calculation section 634 and outputs a result thereof. A low-pass filter may be used as the moving average section 635.

The gain determination section 636 determines a gain coefficient according to the output result of the moving average section 635, and supplies the determined gain coefficient to the multiplication section 640. Specifically, when a value after the moving average by the moving average section 635 is greater than 0, the gain coefficient greater than 1 is determined. The gain determination section 636 sets the gain coefficient greater as the value after the moving average by the moving average section 635 is greater. In other words, the gain determination section 636 sets the gain coefficient such that a reaction force applied to the steering member 410 becomes greater as the value after the moving average by the moving average section 635 is greater.

The multiplication section 640 multiplies the correction control amount determined by the correction control amount determination section 624 by the gain coefficient determined by the gain determination section 636 to supply the correction control amount with gain to the control amount correction section 612.

The control amount correction section 612 generates the steering control amount by adding the correction control amount with gain supplied from the multiplication section 640 to the control amount calculated by the control amount calculation section 611. In other words, the control amount correction section 612 corrects the control amount calculated by the control amount calculation section 611 with reference to the lateral G of the vehicle body 200, the steering angle of the steering member 410, and the steering angle speed of the steering member 410.

As described above, the control amount correction section 612 corrects the control amount calculated by the control amount calculation section 611 with reference to the lateral G of the vehicle body 200, the steering angle of the steering member 410, and the steering angle speed of the steering member 410, so that the assist torque or the reaction force torque can be applied to the steering member 410 with little unusual feeling to a driver.

In the above-described configuration, the control amount correction section 612 corrects the control amount when the steering member 410 is in the switch-back state, the steering angle speed of the steering member 410 or the absolute value thereof is equal to or greater than the predetermined value, and the lateral G value of the vehicle body 200 or the absolute value thereof is less than the predetermined value.

The inventor has recognized that a phenomenon of so-called "torque loss" is likely to occur when the steering member is in the switch-back state, the steering angle speed of the steering member or the absolute value thereof is equal to or greater than the predetermined value, and the lateral G value or the absolute value thereof is less than the predetermined value.

Here, a specific process how the "torque loss" occurs will be described as follows. First, when the driver performs steering, a roll is generated in the vehicle 900. When the roll is generated, a hydraulic shock absorber provided in the suspension device 100 is contracted. Then, a positional relationship between a tie rod and a lower arm changes, and as a result, a toe angle changes. Thus, the rack shaft 480 is pulled toward the contracted hydraulic shock absorber. In a configuration in which the gain calculation section 630 is not provided, in this state, when the driver switches back the steering member 410, only reaction force torque smaller than that assumed by the driver is generated, and the phenomenon of the "torque loss" could occur.

The roll is generated, for example, by a frictional force between the tire 310 and the ground resisting the lateral G to the vehicle 900. Thus, the roll can be generated by the lateral G. Therefore, a roll state in the vehicle 900 can be estimated from the lateral G.

According to the above-described configuration including the gain calculation section 630, since the phenomenon of the "torque loss" can be suitably suppressed, the assist torque or the reaction force torque can be applied with less unusual feeling to a driver.

In the above-described configuration, when the steering member 410 is in the switch-back state, the steering angle speed of the steering member 410 or the absolute value thereof is equal to or greater than the predetermined value, and the lateral G value supplied from the suspension control section 650 or the absolute value thereof is less than the predetermined value, the control amount correction section 612 corrects the control amount such that the reaction force applied to the steering member 410 becomes greater than that of a case different from the above case.

Therefore, according to the above-described configuration, since the phenomenon of the "torque loss" can be more suitably suppressed, the assist torque or the reaction force torque can be applied with less unusual feeling to the driver.

For example, when the frictional force between the tire 310 and the ground resisting the lateral G to the vehicle 900 is different between the front and rear tires 310 of the vehicle 900, a yaw can be generated. The lateral G in the vehicle 900 can be generated by a centrifugal force by this yaw motion. Therefore, the roll state in the vehicle 900 can be estimated by obtaining the lateral G value in the vehicle 900 based upon the yaw rate value acquired from the yaw rate sensor 350 and by referring to the lateral G value based on the yaw rate value. For example, when the ECU 600 corrects the control amount calculated by the control amount calculation section 611 with reference to the lateral G value generated by the centrifugal force by the yaw motion of the vehicle 900, the steering angle of the steering member 410, and the steering angle speed of the steering member 410, the unnatural feeling of the driver from the torque loss can be reduced.

The ECU 600 may also use the lateral G value calculated with reference to the yaw rate value from the yaw rate sensor 350, the lateral G value from the lateral G sensor 330, and a both thereof as the lateral G value.

[Implementation Example by Software]

A control block (steering control section 610) of the ECU 600 may be implemented by a logic circuit (hardware) formed in an integrated circuit (IC chip), or may be implemented by software using a central processing unit (CPU).

In the latter case, the ECU 600 includes: the CPU that executes instructions of a program which is software for implementing each function; a read only memory (ROM) or a storage device (referred to as a "recording medium") in which the program and various data are recorded so as to be readable by a computer (or CPU); and a random access memory (RAM) into which the program is loaded. An object of the invention is achieved when the computer (or CPU) reads the program from the recording medium and executes the program. As the recording medium, a "non-transitory tangible medium" such as a tape, a disk, a card, a semiconductor memory, and a programmable logic circuit can be used. The program may be supplied to the computer via any transmission medium (such as a communication network and a broadcast wave) capable of transmitting the program. The present invention can also be implemented in a form of a data signal embedded in a carrier wave in which the program is embodied by electronic transmission.

The present invention is not limited to the above-described embodiments, and various modifications can be made within the scope of the claims, and embodiments obtained by appropriately combining technical methods respectively disclosed in the different embodiments are also included in the technical scope of the present invention.

The invention claimed is:

1. A control device comprising:
a control amount calculation section configured to calculate a control amount for controlling a magnitude of a reaction force torque with reference to a steering torque applied to a steering member; and
a control amount correction section configured to correct the control amount calculated by the control amount calculation section with reference to acceleration in a lateral direction of a vehicle body, a steering angle of the steering member, and a steering angle speed of the steering member, wherein
the control device is configured to apply the reaction force torque to the steering member, and
the control amount correction section is configured to correct the control amount calculated by the control amount calculation section such that the reaction force torque applied to the steering member becomes larger when the steering member is in a switch-back state, the steering angle speed of the steering member or an absolute value thereof is equal to or greater than a predetermined value, and the acceleration in the lateral direction of the vehicle body or an absolute value thereof is less than a predetermined value.

2. A control device comprising:
a control amount calculation section configured to calculate a control amount for controlling a magnitude of a reaction force torque with reference to a steering torque applied to a steering member; and
a control amount correction section configured to correct the control amount calculated by the control amount calculation section with reference to a yaw rate of a vehicle body, a steering angle of the steering member, and a steering angle speed of the steering member, wherein
the control device is configured to apply the reaction force torque to the steering member, and
the control amount correction section is configured to correct the control amount calculated by the control amount calculation section such that the reaction force torque applied to the steering member becomes larger when the steering member is in a switch-back state, the steering angle speed of the steering member or an absolute value thereof is equal to or greater than a predetermined value, and acceleration in a lateral direction of the vehicle body calculated by using the yaw rate or an absolute value thereof is less than a predetermined value.

* * * * *